United States Patent
Adams et al.

(10) Patent No.: US 10,430,571 B2
(45) Date of Patent: Oct. 1, 2019

(54) TRUSTED UI AUTHENTICATED BY BIOMETRIC SENSOR

(71) Applicant: BlackBerry Limited, Waterloo (CA)

(72) Inventors: Neil Patrick Adams, Waterloo (CA); Catalin Visinescu, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 283 days.

(21) Appl. No.: 15/257,496

(22) Filed: Sep. 6, 2016

(65) Prior Publication Data
US 2018/0069853 A1 Mar. 8, 2018

(51) Int. Cl.
*G06F 21/32* (2013.01)
*G06F 21/31* (2013.01)

(52) U.S. Cl.
CPC .............. *G06F 21/32* (2013.01); *G06F 21/31* (2013.01)

(58) Field of Classification Search
CPC .... G06F 21/6218; G06F 21/629; G06F 21/30; G06F 21/31; G06F 21/32; G06F 21/62; G06F 21/6209
See application file for complete search history.

(56) References Cited

U.S. PATENT DOCUMENTS

| | | | | |
|---|---|---|---|---|
| 2007/0143628 A1* | 6/2007 | Genda | | G06F 21/32 713/183 |
| 2007/0245156 A1* | 10/2007 | Minamizawa | | G06F 21/32 713/186 |
| 2008/0001703 A1* | 1/2008 | Goto | | H04M 1/0243 340/5.8 |
| 2010/0138914 A1* | 6/2010 | Davis | | G06F 21/32 726/19 |
| 2011/0013813 A1* | 1/2011 | Yamamoto | | G06K 9/00026 382/124 |
| 2015/0074615 A1* | 3/2015 | Han | | G06K 9/00033 715/863 |
| 2015/0256530 A1* | 9/2015 | Semba | | H04L 63/083 726/5 |
| 2016/0241555 A1* | 8/2016 | Vo | | G06F 21/32 |
| 2017/0026181 A1* | 1/2017 | Chhabra | | G06F 9/45558 |

OTHER PUBLICATIONS

GlobalPlatform; GlobalPlatform Card Technology, Open Firmware Loader for Tamper Resistant Element, Feb. 2017, pp. 1-53.
GlobalPlatform; GlobalPlatform Device Technology, Device API Access Control, Apr. 2017, pp. 1-63.
GlobalPlatform; Web page printout from httpswww.globalplatform.orgmediaguidetrustedui.asp, Guides, pp. 1-2.
GlobalPlatform; Web page printout from httpwww.globalplatform.orgspecificationsdevice.asp, Specifications, pp. 1-3.

* cited by examiner

*Primary Examiner* — Jung W Kim
*Assistant Examiner* — Adrian Stoica
(74) *Attorney, Agent, or Firm* — Ridout & Maybee LLP

(57) ABSTRACT

The security of a personal image in an apparently trusted UI is improved through the use of a fingerprint sensor hardwired to a Trusted Execution Environment. The personal image may be a complete or partial representation of a fingerprint sensed by the fingerprint sensor enhanced through emphasis of features of the fingerprint. Alternatively, the personal image may be an object whose movement within the UI is controlled responsive to data received from the fingerprint sensor.

21 Claims, 7 Drawing Sheets

TRUSTED UI AUTHENTICATED BY BIOMETRIC SENSOR

FIELD

The present application relates generally to trusted user interfaces (UIs) and, more specifically, to a trusted UI authenticated by a biometric sensor.

BACKGROUND

Computing devices are vulnerable to a variety of software attacks. As secure services, such as near field communication (NFC) payment applications and mobile wallets, become increasingly popular on computing devices such as smartphones, tablets, etc., there is a preference for greater, and more interactive, security that will allow an individual to securely use a computing device to authenticate to those services.

Modern computing devices are often controlled based on a system-on-a-chip (SoC) approach. The SoC approach allows for secure and non-secure portions, with the secure portion hardware isolated from the non-secure portion. As an example, within a central processing unit (CPU), software may either reside in the secure portion or the non-secure portion, with a switch between these two portions accomplished by a secure monitor, such as an application processor, or by specific hardware, such as a microcontroller. This concept of secure (trusted) and non-secure (non-trusted) portions extends, beyond the CPU, the memory associated with the CPU and the software, to include transactions on a bus, interrupts and peripheral functions within a SoC.

Isolation technology within application processors is commonly used to run a trusted boot sequence and a trusted operating system (OS) to, thereby, create a Trusted Execution Environment (TEE). Typical use cases include the protection of authentication mechanisms, cryptography and Digital Rights Management (DRM). Applications that run in the secure portions may be called "Trusted Apps."

The TEE may be considered to be a secure area that resides in the main processor of a mobile device and allows for sensitive data to be stored, processed and protected. The TEE allows for execution of Trusted Apps, thereby allowing the TEE to provide end-to-end security through the enforcement of protection, confidentiality, integrity and data access rights. The TEE may be considered to be an environment well suited to hosting mobile wallet and payment applications, in that the TEE offers more security than the rich operating system and more functionality than a secure element (SE).

The ability to control a user interface (UI) from a TEE is important. A UI that is controlled from a TEE may be called a "trusted UI." Beneficially, a trusted UI need not communicate with a high-level operating system (HLOS) to arrange presentation of information or to gather input. Information for which a UI would arrange presentation may, for one example, include a prompt for a personal identification number (PIN). Information for which a UI would arrange presentation may, for another example, include a secure code. Input that a UI would gather may, for one example, include a PIN. Conveniently, when a trusted UI maintains sensitive information in a TEE, the sensitive information is maintained more securely than the sensitive information would be maintained if the sensitive information was shared with the HLOS.

For a device that typically executes a secure UI, malware may attempt to present, on the device, an imitation secure UI. When an apparently secure UI is presented on a device, it would be helpful for a user to be able to distinguish a truly secure UI, which is controlled by the TEE, from an imitation secure UI, which is controlled by malware.

BRIEF DESCRIPTION OF THE DRAWINGS

Reference will now be made, by way of example, to the accompanying drawings which show example implementations; and in which.

DETAILED DESCRIPTION

Figure 1:
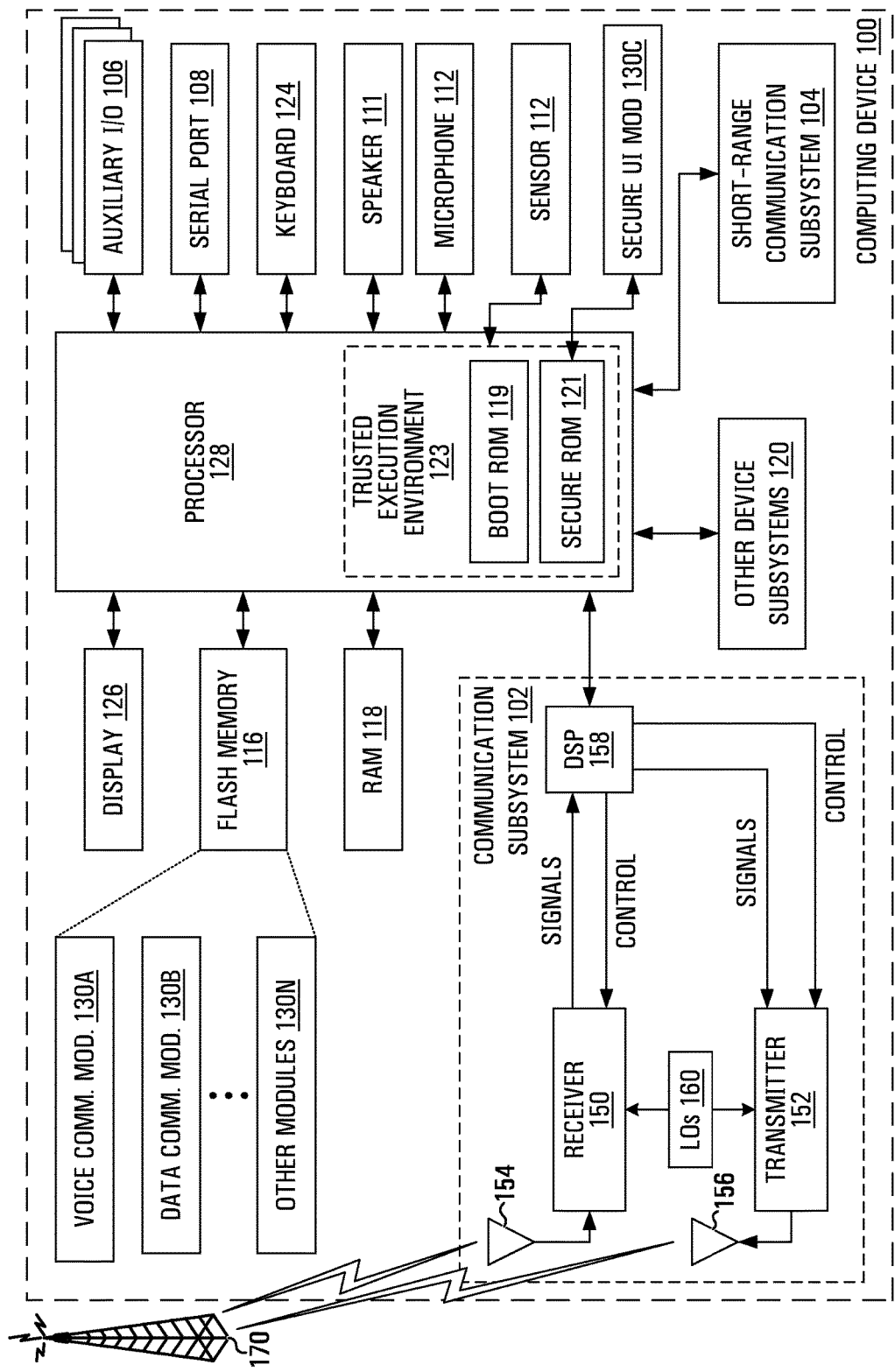
FIG. 1 illustrates an example of a computing device that may carry out aspects of the present disclosure.

The security of a personal image in an apparently trusted UI is improved through the use of a biometric sensor hardwired to a Trusted Execution Environment. The personal image may be a complete or partial representation of a biometric sensed by the biometric sensor enhanced through emphasis of features of the biometric. Alternatively, the personal image may be an object whose movement within the UI is controlled responsive to data received from the biometric sensor. Conveniently, the addition of new hardware is avoided.

According to an aspect of the present disclosure, there is provided a method of controlling, at a Trusted Execution Environment, access to a computing device. The method includes receiving data from a biometric sensor, generating, from the data, a candidate biometric representation, processing the candidate biometric representation to identify a feature and arranging presentation of a user interface. The user interface includes the candidate biometric representation emphasizing the feature and a field configured for receiving input. The method further includes receiving, via the field, input and based on the input, controlling access to the computing device. In other aspects of the present application, a computing device is provided with a processor configured to carry out this method and a computer readable medium is provided for adapting a processor in a computing device to carry out this method.

According to an aspect of the present disclosure, there is provided a method of controlling, at a Trusted Execution Environment, access to a computing device. The method includes presenting, on a display, an object, receiving data from a biometric sensor, controlling, based on the data, movement of the object on the display, arranging presentation of a user interface, the user interface including a field configured for receiving input, receiving, via the field, input and based on the input, controlling access to the computing device. In other aspects of the present application, a computing device is provided with a processor configured to carry out this method and a computer readable medium is provided for adapting a processor in a computing device to carry out this method.

Other aspects and features of the present disclosure will become apparent to those of ordinary skill in the art upon review of the following description of specific implementations of the disclosure in conjunction with the accompanying figures.

Up to now, the task of signaling to the user that the UI being presented is a truly secure UI, which is controlled by the TEE, has been accomplished using a few different methods. In one example method, presentation of the truly secure UI is accompanied by a specific vibration known to the user. In a second example method, presentation of the truly secure UI includes presentation of an image and/or text previously chosen by the user. In a third example method, presentation of the truly secure UI is accompanied by a flash of a dedicated light emitting diode (LED) connected to the TEE.

In an analysis of the second example, one notes that it would be difficult for malware to select, for an imitation secure UI, the same image that was selected by the user for the truly secure UI. However, a scenario wherein the imitation secure UI selects the same image that was selected by the user for the truly secure UI is not impossible. When configuring the truly secure UI, the user may have selected the image from among a set of images stored in the file system of the device. Alternatively, the user may have selected the image from among a set of images stored online in association with an online profile of the user. In both cases, the selected image may be available for selection by the malware. Furthermore, there is a correlation between the size of the set of images from which the user has selected an image, the security of the trusted UI. A larger set of images leads to higher security for the trusted UI. A smaller set of images leads to lower security for the trusted UI.

In an analysis of the third example, one notes that adding a dedicated LED connected to the TEE adds hardware costs to the manufacturing stage of a device.

FIG. 1 illustrates a computing device 100 as an example of a computing device that may carry out aspects of the present disclosure. The computing device 100 may comprise a housing, an input device (e.g., a keyboard 124 having a plurality of keys) and an output device (e.g., a display 126), which may comprise a full graphic, or full color, Liquid Crystal Display (LCD). In some embodiments, the display 126 may comprise a touchscreen display. In such embodiments, the keyboard 124 may comprise a virtual keyboard. Other types of output devices may alternatively be utilized. A processing device (a microprocessor 128) is shown schematically in FIG. 1 as coupled between the keyboard 124 and the display 126. The microprocessor 128 controls the operation of the display 126, as well as the overall operation of the computing device 100, in part, responsive to actuation of the keys on the keyboard 124 by a user.

Examples for computing device include devices that may be called traditional (desktop computers and laptop computers), devices that may be called mobile (tablet computers and smartphones) and devices that may not have traditionally been considered computing devices, such as vehicles (including cars and flying drones).

The housing may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

In addition to the microprocessor 128, other optional parts of the computing device 100 are shown schematically in FIG. 1. These may include a communications subsystem 102, a short-range communications subsystem 104, the keyboard 124 and the display 126. The computing device 100 may further include other input/output devices, such as a set of auxiliary I/O devices 106, a serial port 108, a speaker 111, a microphone 112 and a biometric sensor 107. The computing device 100 may further include memory devices including a flash memory 116 and a Random Access Memory (RAM) 118 and various other device subsystems 120.

Memory devices may also be included in the design of the microprocessor 128. For example, the microprocessor 128 may include a boot ROM 119 and a secure RAM 121. Together, the boot ROM 119 and the secure RAM 121 may be seen to form a Trusted Execution Environment 123. The biometric sensor 107 may be hardwired to the trusted execution environment 123.

The computing device 100 may comprise a two-way radio frequency (RF) communication device having voice and/or data communication capabilities. In addition, the computing device 100 may have the capability to communicate with other computer systems via the Internet.

Operating system software executed by the microprocessor 128 may be stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 128, in addition to its operating system functions, enables execution of software applications on the computing device 100. A set of software applications that control basic device operations, such as a voice communications module 130A and a data communications module 130B, may be installed on the computing device 100 during manufacture. A secure UI module 130C may also be installed in the secure ROM 121 during manufacture, to implement aspects of the present disclosure. As well, additional software modules, illustrated as other software modules 130N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 170 represented by a radio tower. The data items managed by the PIM application may be seamlessly integrated, synchronized and updated via the wireless carrier network 170 with the device user's corresponding data items stored or associated with a host computer system.

Communication functions, including data and, optionally, voice communications, are performed through the communication subsystem 102 and, possibly, through the short-range communications subsystem 104. The communication subsystem 102 includes a receiver 150, a transmitter 152 and one or more antennas, illustrated as a receive antenna 154 and a transmit antenna 156. In addition, the communication subsystem 102 also includes a processing module, such as a digital signal processor (DSP) 158, and local oscillators (LOs) 160. The specific design and implementation of the communication subsystem 102 is dependent upon the communication network in which the computing device 100 is intended to operate. For example, the communication subsystem 102 of the computing device 100 may be designed to operate with the General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the computing device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in GPRS networks, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the computing device 100 may send and receive communication signals over the wireless carrier network 170. Signals received from the wireless carrier network 170 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless carrier network 170 are processed (e.g., modulated and encoded) by the DSP 158 and are then provided to the transmitter 152 for digital to analog conversion, frequency up conversion, filtering, amplification and transmission to the wireless carrier network 170 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 102 and is input to the microprocessor 128. The received signal is then further processed by the microprocessor 128 for output to the display 126, or alternatively to some auxiliary I/O devices 106. A device user may also compose data items, such as e-mail messages, using the keyboard 124 and/or some other auxiliary I/O device 106, such as a touchpad, a rocker switch, a thumbwheel, a trackball, a touchscreen, or some other type of input device. The composed data items may then be transmitted over the wireless carrier network 170 via the communication subsystem 102.

In an optional voice communication mode, overall operation of the device is substantially similar to the data communication mode, except that received signals are output to the speaker 111, and signals for transmission are generated by a microphone 112. Alternative voice or audio I/O subsystems, such as a voice message recording subsystem, may also be implemented on the computing device 100. In addition, the display 126 may also be utilized in voice communication mode, for example, to present the identity of a calling party, the duration of a voice call, or other voice call related information.

The short-range communications subsystem 104 enables communication between the computing device 100 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication (NFC) module, etc.

In overview, as a consequence of the biometric sensor 107 being hard wired to the Trusted Execution Environment 123, sensor data from the biometric sensor 107 may captured by the secure UI module 130C. Conveniently, since the sensor data from the biometric sensor is captured by the secure UI module 130C, exposure of the sensor data from the biometric sensor 107 to the HLOS is avoided. Biometric notifications, which would normally be sent to the HLOS, are suppressed while the secure UI is shown.

In the case wherein the biometric sensor 107 comprises a fingerprint sensor 107, an image of a fingerprint of the user may be used as the item that signals to the user that the UI being presented is a truly secure UI.

Figure 2B:
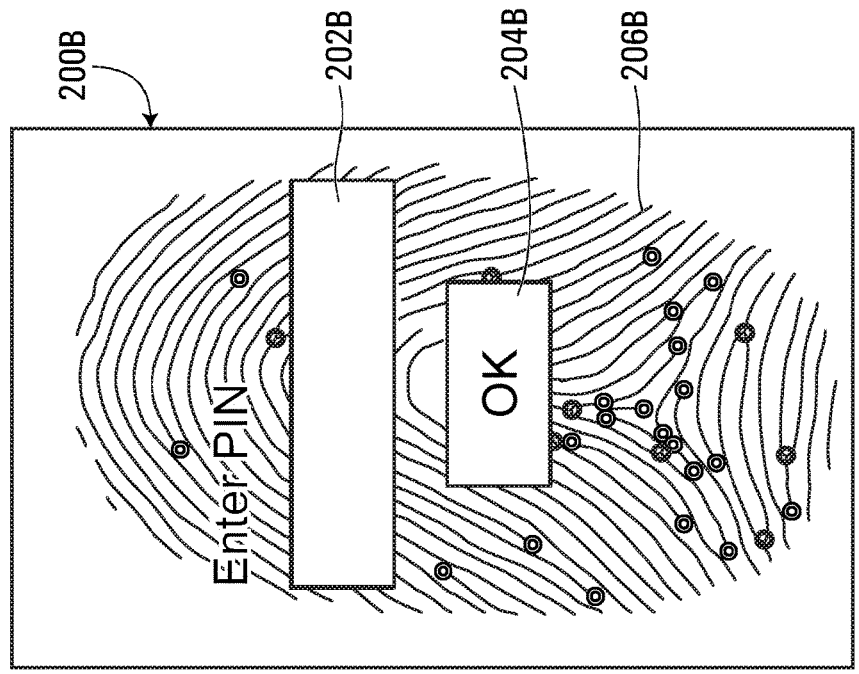
FIG. 2B illustrates a second example secure UI.
Figure 2A:
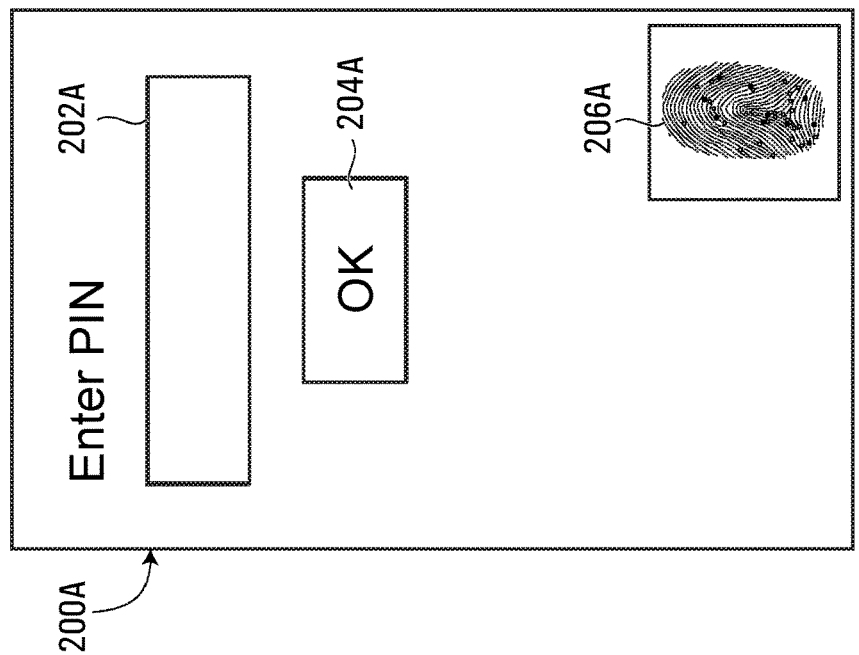
FIG. 2A illustrates a first example secure UI.

In a first example secure UI 200A, illustrated in FIG. 2A, a first image 206A of a fingerprint of the user is presented in a small section in the lower right of the first example secure UI 200A. The first example secure UI 200A includes a first PIN entry field 202A and a first "OK" button 204A.

In a second example secure UI 200B, illustrated in FIG. 2B, a second image 206B of a fingerprint of the user is presented in the background of the second example secure UI 200B. The second example secure UI 200B includes a second PIN entry field 202B and a second "OK" button 204B.

Figure 3:
FIG. 3 illustrates an example representation of a fingerprint with several distinct types of minutiae referenced.

FIG. 3 illustrates an example representation 300 of a fingerprint with several distinct types of minutiae referenced. Minutiae are the features of fingerprints that help distinguish one fingerprint from another fingerprint. One of the minutiae is called a ridge ending 308 and may be identified as an abrupt end of a ridge. Another one of the minutiae is called a ridge bifurcation 306, wherein a single ridge divides into two ridges. A further one of the minutiae is called an island 310, which may generally refer to a single small ridge inside a short ridge or ridge ending that is not connected to other ridges. An even further one of the minutiae is called a crossover, or a bridge 302, which may generally refer to a short ridge that runs between two parallel ridges. A bridge may also be called a crossover. A still further one of the minutiae is called a delta 312, which may generally refer to a Y-shaped ridge meeting. Other known minutiae include a core 304 and a pore 314.

Clearly, a presented image of a fingerprint of the user has a usefulness correlated to the degree to which the user can recognize the presented image as his or her own fingerprint.

Accordingly, rather than relying upon the user's ability to identify minutiae, it is proposed herein, to arrange for the processor to process the received fingerprint representation to identify the minutiae. Thereafter, the processor may highlight, or otherwise emphasize, the minutiae while presenting the fingerprint representation on the display 126.

Figure 4:
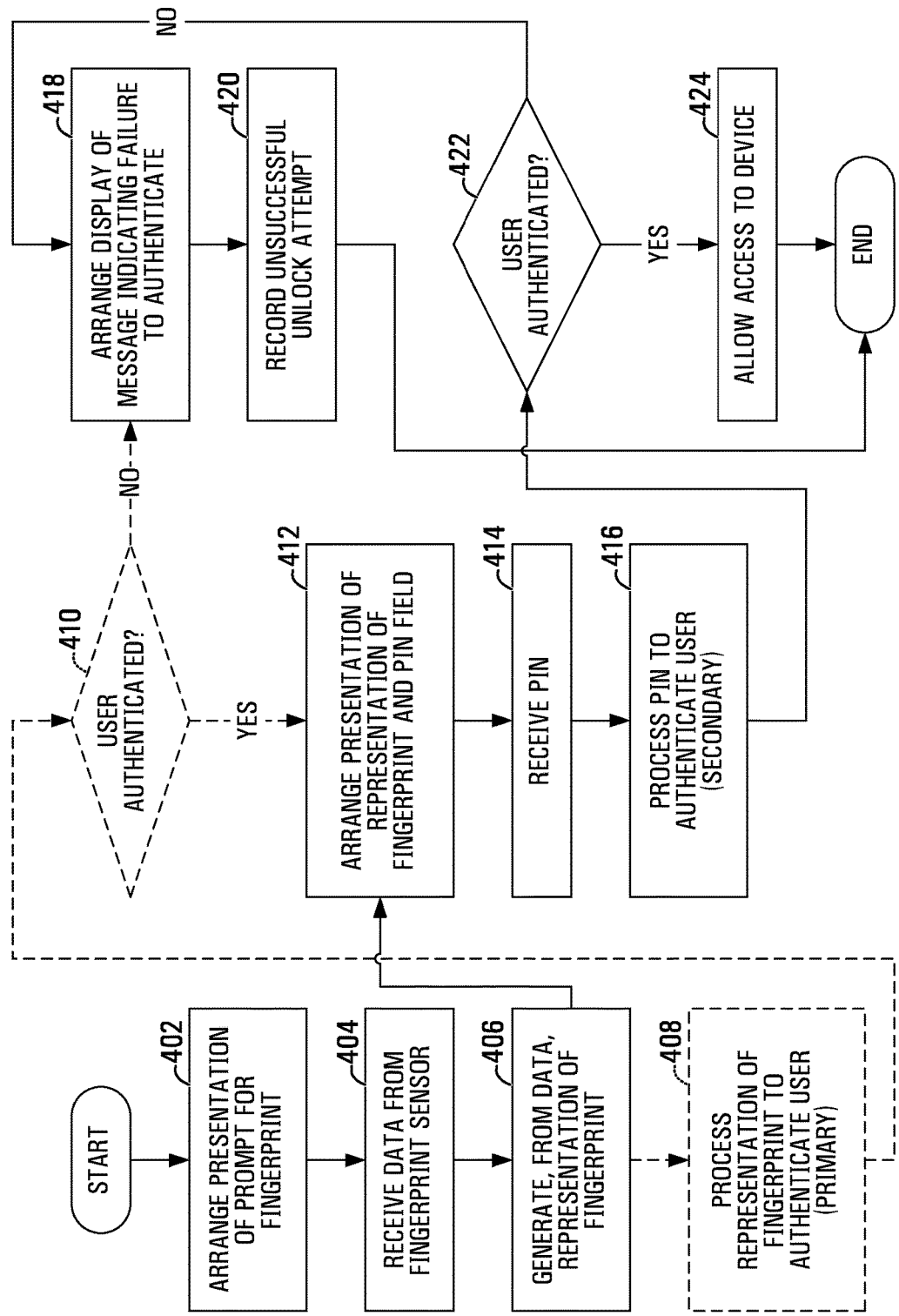
FIG. 4 illustrates examples steps in a method of controlling access to the computing device of FIG. 1 according to aspects of the present application.

FIG. 4 illustrates examples steps in a method of controlling access to the computing device 100 according to aspects of the present application. Initially, the processor 128, under control of the secure UI, arranges (step 402) presentation of a prompt for fingerprint on the display 126.

Responsive to the prompt, the user provides a finger to the fingerprint sensor 107. Upon sensing the fingerprint, the fingerprint sensor 107 transmits the sensor data to the Trusted Execution Environment 123, to which the fingerprint sensor 107 is hardwired. At the Trusted Execution Environment 123, the sensor data is received (step 404) and captured by the secure UI module 130C.

Responsive to receiving (step 404) the sensor data, the processor 128, while executing the secure UI module 130C, may generate (step 406), from the sensor data, a candidate digital representation of the fingerprint provided, by the user, to the fingerprint sensor 107.

The processor 128, while executing the secure UI module 130C, may then arrange (step 412) presentation, on the display 126, of the first image 206A based on the candidate digital representation of the fingerprint. As discussed hereinbefore, the first image 206A may be presented as part of the first example secure UI 200A with the PIN entry field 202A and the first "OK" button 204A. Arranging (step 412) presentation involves processing the candidate digital representation of the fingerprint to identify minutiae. Accordingly, the first image 206A includes indications highlighting the minutiae in a manner that allows the user to more readily identify the first image 206A as a visual representation of the user's own fingerprint, thereby allowing the user to have increased confidence that the first example secure UI 200A presented on the display 126 is a truly secure UI, rather than an imitation secure UI.

With increased confidence that the first example secure UI 200A presented on the display 126 is a truly secure UI, rather than an imitation secure UI, the user may use the keyboard 124 (or a software keyboard presented on the display 126) to enter a candidate PIN. Despite containing the word "number" in an expansion of the acronym "PIN," it should be understood that a PIN may contain characters that are not numbers, such as, for only two examples, letters and/or punctuation. Upon receiving (step 414) the candidate PIN, the processor 128, while executing the secure UI module 130C, may process (step 416) the candidate PIN.

Processing (step 416) the candidate PIN may be predicated upon enrollment of a PIN at a time of setting up the computing device 100. The enrolled PIN may be subjected to a hashing algorithm and the hashed enrolled PIN may be securely stored. Accordingly, processing (step 416) the candidate PIN may, for example, involve subjecting the candidate PIN to the same hashing algorithm and then comparing the hashed candidate PIN to the hashed enrolled PIN. Upon determining that the hashed candidate PIN matches the hashed enrolled PIN, the user may be considered to have been authenticated.

Notably, the functions of the secure UI module 130C may not be limited to authenticating the user to the device. Indeed, the secure UI module 130C could, for a first example, function to prompt for a PIN for authorizing a smart card to decrypt a message. The secure UI module 130C could, for a second example, arrange a display of an indication of a security state for the device. In the latter example, no PIN is required.

Upon determining (step 422), based on the processing (step 416) of the candidate PIN, that the user has been authenticated, the processor 128, while executing the secure UI module 130C, may allow (step 424) the user access to the computing device 100.

Upon determining (step 422), based on the processing (step 416) of the candidate PIN, that the user has not been authenticated, the processor 128, while executing the secure UI module 130C, may arrange (step 418) display of a message indicating a failure to authenticate. The message may, for example, be arranged to be displayed on the display 126. Further responsive to determining (step 422) that the user has not been authenticated, the secure UI module 130C may record (step 420) an unsuccessful unlock attempt. A count of unsuccessful unlock attempts may be used to limit, to a specific quantity, the number of unsuccessful unlock attempts that are allowed before PIN entry is disabled.

Assuming that, as part of setting up security for the computing device 100, the user has enrolled a fingerprint, optional further security enhancements may be made available. For example, upon generating (step 406) the candidate digital fingerprint representation, the processor 128, under control of the secure UI module 130C, may process (step 408) the candidate digital fingerprint representation to authenticate the user. The arranging (step 412) of presentation, on the display 126, of the first image 206A as part of the first example secure UI 200A may be dependent upon authentication of the user. To authenticate the user, the processor 128 may, in one example, compare the locations of minutiae in the candidate digital fingerprint representation to locations of minutiae in the enrolled fingerprint. Other methods to authenticate a fingerprint are known to those in the art. The processor 128 may determine a quantity of locations of minutiae in the candidate digital fingerprint representation corresponding to locations of minutiae in the enrolled fingerprint. Determining (step 410) that the user has been authenticated may comprise determining that the quantity exceeds a threshold.

Upon determining (step 410) that the user has been authenticated, the processor 128, while executing the secure UI module 130C, may proceed to arrange (step 412) presentation, on the display 126, of the first example secure UI 200A. Receipt and processing of the PIN may then proceed as described hereinbefore.

Upon determining (step 410), based on the processing (step 408) of the candidate digital fingerprint representation, that the user has not been authenticated, the processor 128, while executing the secure UI module 130C, may arrange (step 418) display of a message indicating a failure to authenticate. The message may, for example, be arranged to be displayed on the display 126. Further responsive to determining (step 410) that the user has not been authenticated, the secure UI module 130C may record (step 420) an unsuccessful unlock attempt. A count of unsuccessful unlock attempts may be used to limit a specific quantity of unsuccessful unlock attempts.

The fingerprint sensor 107 may be rectangular and sized to receive an entire fingerprint at once. Such a fingerprint sensor 107 may be called a "static" fingerprint sensor. The fingerprint sensor 107 may be bar-shaped and sized to only receive a thin portion of a fingerprint at any one time. Such a fingerprint sensor forms an entire fingerprint representation responsive to a user dragging a finger across the sensor. Such a fingerprint sensor 107 may be called a "dynamic" fingerprint sensor.

When using a static fingerprint sensor 107, the processor 128 may arrange (step 412) presentation of the candidate representation of the fingerprint all at once. Alternatively, when using a dynamic fingerprint sensor, the processor 128 may arrange (step 412) presentation of the candidate representation of the fingerprint as the sensor data is received from the fingerprint sensor 107.

Figure 5B:
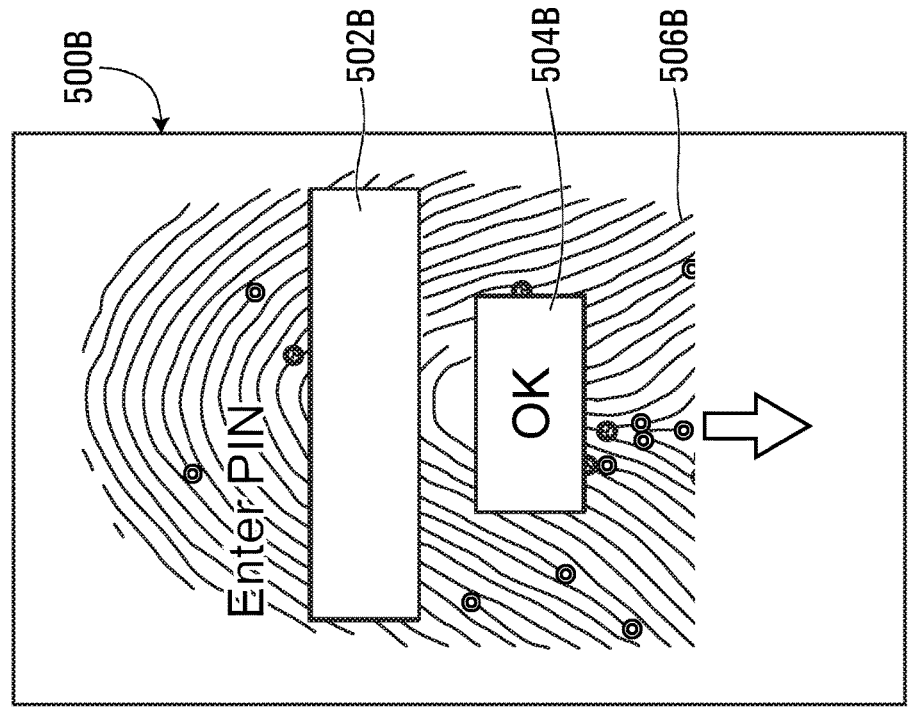
FIG. 5B illustrates a fourth example secure UI.
Figure 5A:
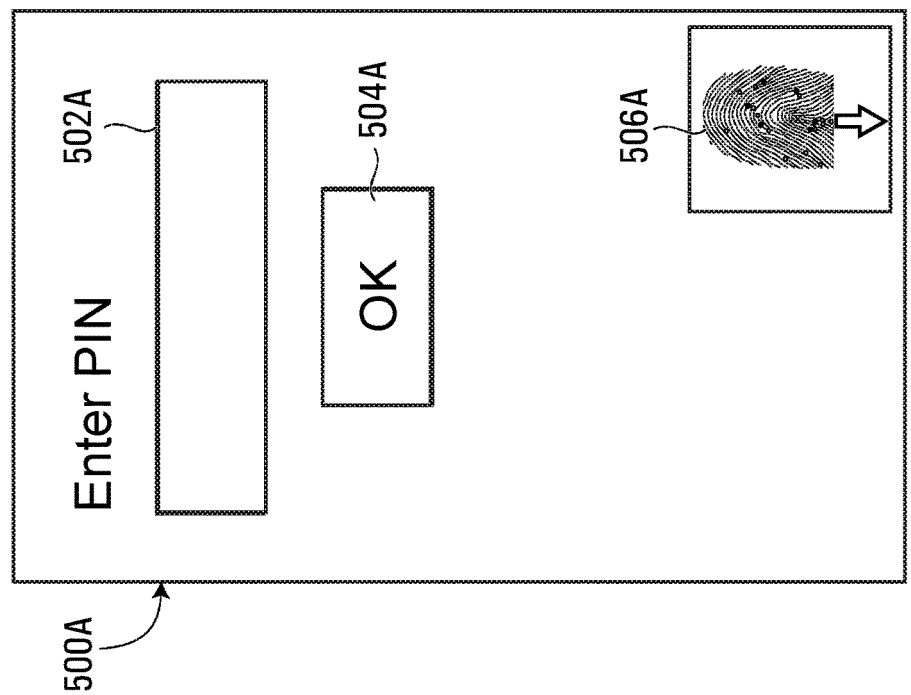
FIG. 5A illustrates a third example secure UI.

In a third example secure UI 500A, illustrated in FIG. 5A, a third image 506A of a fingerprint of the user (notably, an incomplete image) is presented in a small section in the lower right of the third example secure UI 500A. The third example secure UI 500A includes a third PIN entry field 502A and a third "OK" button 504A.

In a fourth example secure UI 500B, illustrated in FIG. 5B, a fourth image 506B of a fingerprint of the user (notably, an incomplete image) is presented in the background of the fourth example secure UI 500B. The fourth example secure UI 500B includes a fourth PIN entry field 502B and a fourth "OK" button 504B.

Notably, the third image 506A, in the third example secure UI 500A, and the fourth image 506B, in the fourth example secure UI 500B, are only partially displayed, since the images 506A, 506B are being presented as the sensor data is received from the fingerprint sensor 107.

Conveniently, the user can use a correlation of the rate of the movement of their finger across the fingerprint sensor 107 with the rate of the presentation of the fingerprint image 506A, 506B in the secure UI 500A, 500B to authenticate the UI. That is, the correlation allows the user to have increased confidence that the example secure UI 500A, 500B presented on the display 126 is a truly secure UI, rather than an imitation secure UI.

In all cases the fingerprint may be removed from the display 126 after a timeout period.

When using a dynamic fingerprint sensor, the processor 128 may use sensor data received from the fingerprint sensor 107 to control an aspect of the secure UI.

Figure 6B:
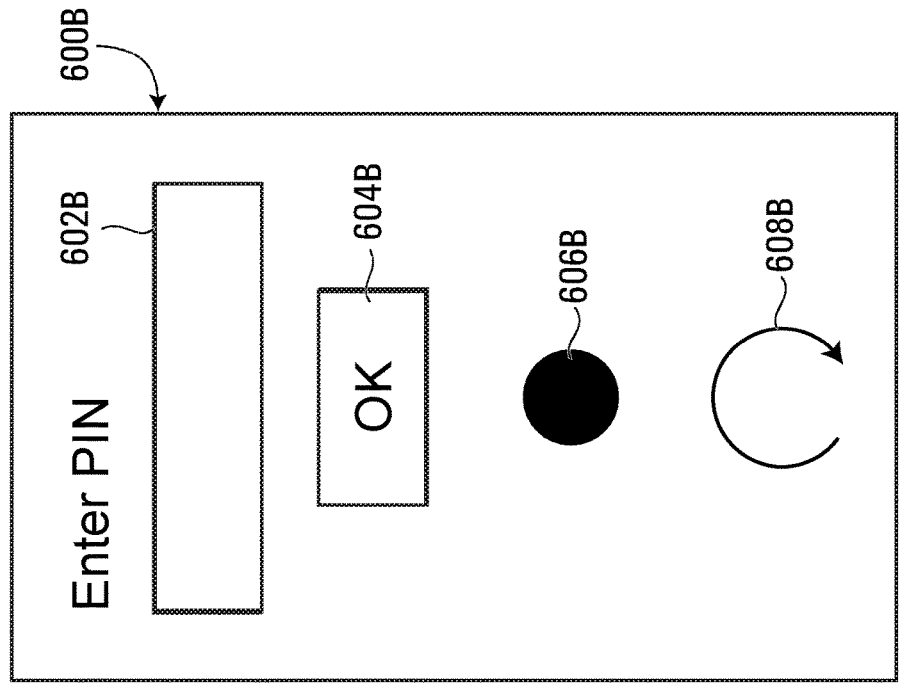
FIG. 6B illustrates a sixth example secure UI.
Figure 6A:
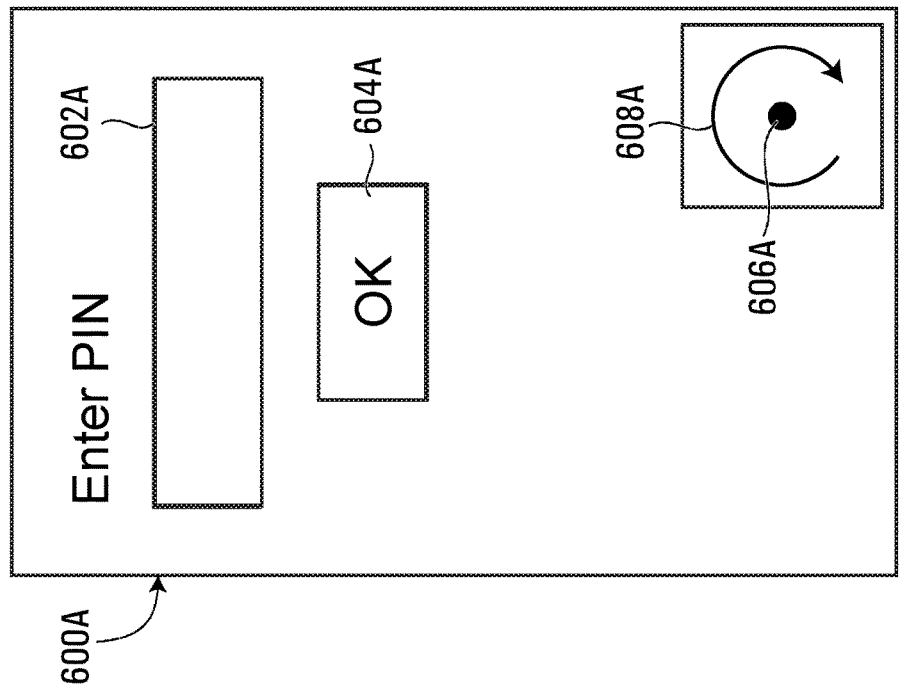
FIG. 6A illustrates a fifth example secure UI.

In a fifth example secure UI 600A, illustrated in FIG. 6A, a small object 606A is presented in a small section in the lower right of the fifth example secure UI 600A. Also presented in the small section in the lower right of the fifth example secure UI 600A is a small instruction arrow 608A. The fifth example secure UI 600A includes a fifth PIN entry field 602A and a fifth "OK" button 604A.

In a sixth example secure UI 600B, illustrated in FIG. 6B, a large object 606B is presented in a lower half of the sixth example secure UI 600B. Also presented in the lower half of the sixth example secure UI 600B is a large instruction arrow 608A. The sixth example secure UI 600B includes a sixth PIN entry field 602B and a sixth "OK" button 604B.

Figure 7:
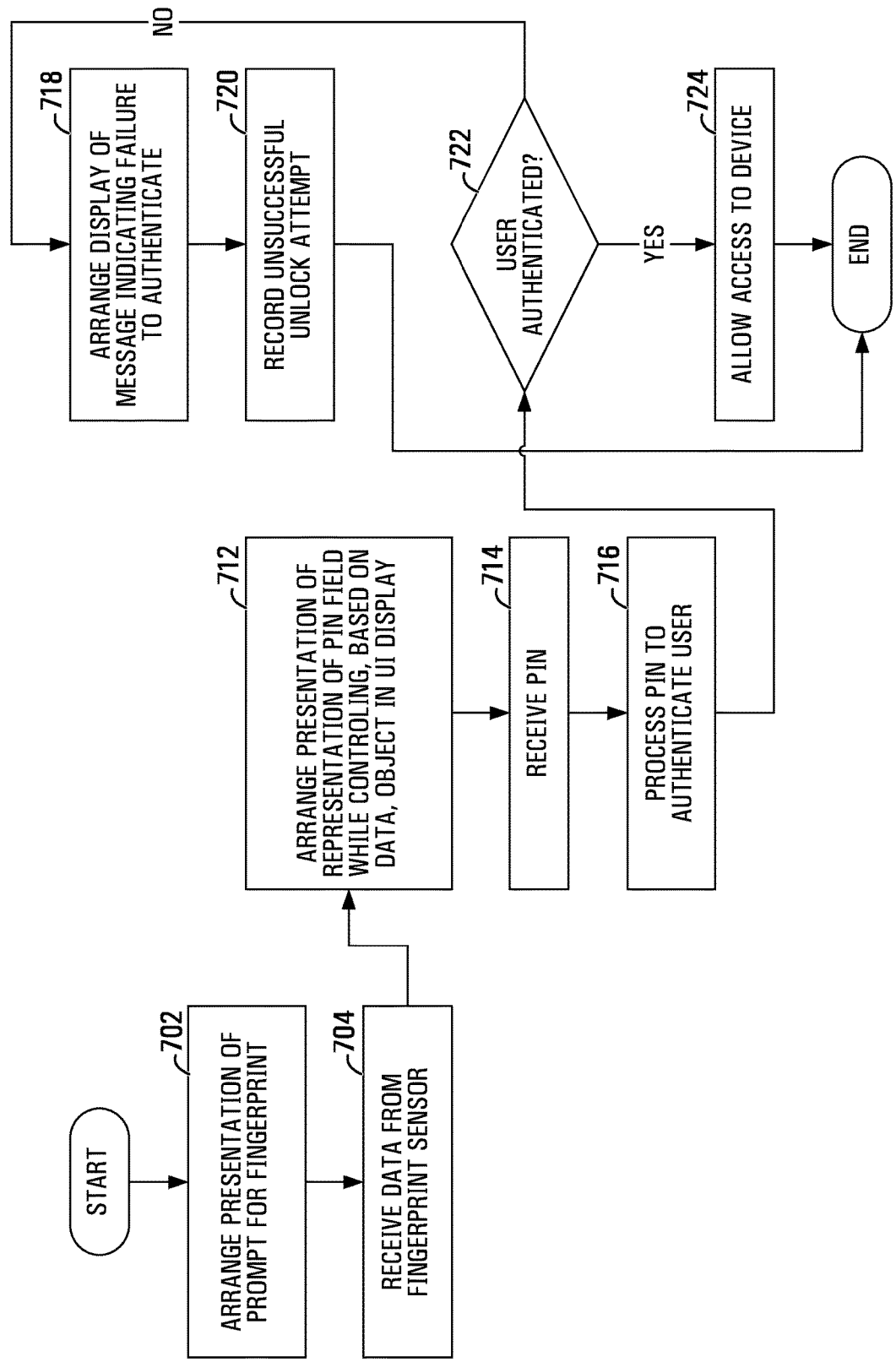
FIG. 7 illustrates examples steps in a method of controlling access to the computing device of FIG. 1 according to aspects of the present application.

FIG. 7 illustrates examples steps in a method of controlling access to the computing device 100 of FIG. 1 according to aspects of the present application. Initially, the processor 128, under control of the secure UI, arranges (step 702) presentation, on the display 126, of a prompt for a fingerprint in motion. For example, the prompt may comprise the small object 606A and the small instruction arrow 608A, as illustrated in the lower right of the fifth example secure UI 600A of FIG. 6A.

Responsive to the prompt, the user provides a fingerprint in motion to the fingerprint sensor 107, with the motion based on the small instruction arrow 608A. Upon sensing the fingerprint in motion, the fingerprint sensor 107 transmits the sensor data to the Trusted Execution Environment 123, to which the fingerprint sensor 107 is hardwired. At the Trusted Execution Environment 123, the sensor data is received (step 704) and captured by the secure UI module 130C.

The processor 128, while executing the secure UI module 130C, may then arrange (step 712) presentation, on the display 126, of the small object 606A in motion as part of the fifth example secure UI 600A with the fifth PIN entry field 602A and the fifth "OK" button 204A. The processor 128 may control the motion of the small object 606A based on ongoing reception (step 704) of the sensor data. The user should experience a correlation between movement of the user's finger and motion of the small object 606A, thereby allowing the user to have increased confidence that the fifth example secure UI 600A presented on the display 126 is a truly secure UI, rather than an imitation secure UI.

With increased confidence that the fifth example secure UI 600A presented on the display 126 is a truly secure UI, rather than an imitation secure UI, the user may use the keyboard 124 (or a software keyboard presented on the display 126) to enter a candidate PIN. Upon receiving (step 714) the candidate PIN, the processor 128, while executing the secure UI module 130C, may process (step 716) the candidate PIN.

Upon determining (step 722), based on the processing (step 716) of the candidate PIN, that the user has been authenticated, the processor 128, while executing the secure UI module 130C, may allow (step 724) the user access to the computing device 100.

Upon determining (step 722), based on the processing (step 716) of the candidate PIN, that the user has not been authenticated, the processor 128, while executing the secure UI module 130C, may arrange (step 718) display of a message indicating a failure to authenticate. The message may, for example, be arranged to be displayed on the display 126. Further responsive to determining (step 722) that the user has not been authenticated, the secure UI module 130C may record (step 720) an unsuccessful unlock attempt. A count of unsuccessful unlock attempts may be used to limit a specific quantity of unsuccessful unlock attempts.

Conveniently, in aspects of the present application, the image, which allows the user to have increased confidence that the presented UI is a truly secure UI, rather than an imitation secure UI, is only shown responsive to the user providing their fingerprint to the sensor. This is an improvement over other methods which always show the image so an attacker can determine the image if they have access to the device and could craft malware showing the image.

The biometric sensor may, in some cases, not be a fingerprint sensor. Other biometrics, for example, retinal scans and ear prints, are also known to be distinct to a given person and can be scanned when controlling access to a trusted execution environment. In one case, the biometric sensor 107 may track eye movements and, responsive to the eye movements, the processor 128 may control the motion of the small object 606A.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of controlling, while executing a Trusted Execution Environment (TEE), access to a computing device, the method comprising:

receiving data from a biometric sensor, said data being available to the computing device when executing the TEE and unavailable to the computing device when executing a high level operating system;
generating, from the data, a candidate biometric representation;
processing the candidate biometric representation to identify a feature;
responsive to the processing, arranging presentation of a user interface, the user interface including:
the candidate biometric representation emphasizing the feature, thereby establishing that the computing device is executing the TEE; and
a field configured for receiving input;
receiving, via the field, input; and
based on only the input, controlling access to the computing device.

2. The method of claim 1 wherein the biometric sensor comprises a fingerprint sensor.

3. The method of claim 2 wherein the feature comprises one of a plurality of minutiae.

4. The method of claim 3 wherein the plurality of minutiae includes at least one of a bridge, a core, a ridge bifurcation, a ridge ending, an island, a delta, or a pore.

5. The method of claim 1 wherein the receiving the data from the biometric sensor comprises receiving incomplete data from the biometric sensor while the biometric sensor is sensing a biometric.

6. The method of claim 1 wherein arranging presentation of the user interface further comprises presenting an incomplete candidate biometric representation.

7. The method of claim 1 further comprising only proceeding to the arranging presentation of the user interface upon determining that the candidate biometric representation has been authenticated.

8. The method of claim 1 wherein the determining that the candidate biometric representation has been authenticated comprises comparing the candidate biometric representation to an enrolled biometric representation.

9. A computing device comprising:
a biometric sensor; and
a processor configured to:
execute a high level operating system;
execute a Trusted Execution Environment (TEE);
receive data from the biometric sensor, said data being available to the TEE, when executed by the processor, and unavailable to the high level operating system, when executed by the processor;
generate, from the data, a candidate biometric representation;
process the candidate biometric representation to identify a feature;
arrange presentation of a user interface, the user interface including:
the candidate biometric representation emphasizing the feature, thereby establishing that the processor is executing the TEE; and
a field configured for receiving input;
receive, via the field, input; and
control, based on only the input, access to the computing device.

10. The computing device of claim 9 wherein the biometric sensor comprises a fingerprint sensor.

11. The computing device of claim 10 wherein the feature comprises one of a plurality of minutiae.

12. The computing device of claim 11 wherein the plurality of minutiae includes at least one of a bridge, a core, a ridge bifurcation, a ridge ending, an island, a delta, or a pore.

13. The computing device of claim 9 wherein the processor is configured to receive incomplete data from the biometric sensor while the biometric sensor is sensing a biometric.

14. A non-transitory computer readable medium having stored thereon computer executable instructions, the computer executable instructions comprising code that, upon execution by a processor in a computing device having a biometric sensor, causes the processor to:
execute a high level operating system;
execute a Trusted Execution Environment (TEE);
receive data from the biometric sensor, said data being available to the processor when executing the TEE, and unavailable to the processor when executing the high level operating system;
generate, from the data, a candidate biometric representation;
process the candidate biometric representation to identify a feature;
arrange presentation of a user interface, the user interface including:
the candidate biometric representation emphasizing the feature, thereby establishing that the processor is executing the TEE; and
a field configured for receiving input;
receive, via the field, input; and
control, based on only the input, access to the computing device.

15. The non-transitory computer readable medium of claim 14 wherein the biometric sensor comprises a fingerprint sensor.

16. The non-transitory computer readable medium of claim 15 wherein the feature comprises one of a plurality of minutiae.

17. The non-transitory computer readable medium of claim 16 wherein the plurality of minutiae includes at least one minutia selected from a group including: a bridge; a core; a ridge bifurcation; a ridge ending; an island; a delta; and a pore.

18. The non-transitory computer readable medium of claim 14 wherein the code further causes the processor to receive incomplete data from the biometric sensor while the biometric sensor is sensing a biometric.

19. A method of controlling, while executing a Trusted Execution Environment (TEE), access to a computing device, the method comprising:
presenting, on a display, an object;
receiving data from a biometric sensor, said data representative to movement, sensed by the biometric sensor, of a user's finger, said data being available to the computing device when executing the TEE and unavailable to the computing device when executing a high level operating system;
controlling, based on the data, movement of the object on the display, such that the movement of the object is correlated to the sensed movement of the user's finger, thereby establishing that the computing device is executing the TEE;
in conjunction with the controlling, arranging presentation of a user interface, the user interface including a field configured for receiving input;
receiving, via the field, input; and
based on only the input, controlling access to the computing device.

20. A computing device comprising:
a display;
a biometric sensor; and
a processor configured to:
- execute a high level operating system;
- execute a Trusted Execution Environment (TEE);
- present, on the display, an object;
- receive data from the biometric sensor, said data representative to movement, sensed by the biometric sensor, of a user's finger, said data being available to the computing device when executing the TEE and unavailable to the computing device when executing the high level operating system;
- control, based on the data, movement of the object on the display, such that the movement of the object is correlated to the sensed movement of the user's finger, thereby establishing that the computing device is executing the TEE;
- in conjunction with the controlling, arrange presentation of a user interface, the user interface including a field configured for receiving input;
- receive, via the field, input; and
- control, based on only the input, access to the computing device.

21. A non-transitory computer readable medium having stored thereon computer executable instructions, the computer executable instructions comprising code that, upon execution by a processor in a computing device having a biometric sensor and a display, causes the processor to:
- execute a high level operating system;
- execute a Trusted Execution Environment (TEE);
- present, on the display, an object;
- receive data from the biometric sensor, said data representative to movement, sensed by the biometric sensor, of a user's finger, said data being unavailable to the computing device when executing the high level operating system;
- control, based on the data, movement of the object on the display, such that the movement of the object is correlated to the sensed movement of the user's finger, thereby establishing that the computing device is executing the TEE;
- in conjunction with the controlling, arrange presentation of a user interface, the user interface including a field configured for receiving input;
- receive, via the field, input; and
- control, based on only the input, access to the computing device.

* * * * *